(12) United States Patent
Matsui et al.

(10) Patent No.: US 7,857,235 B2
(45) Date of Patent: Dec. 28, 2010

(54) AIR CONDITIONING SYSTEM

(75) Inventors: Nobuki Matsui, Osaka (JP); Tetsuyuki Kondo, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 437 days.

(21) Appl. No.: 11/920,927

(22) PCT Filed: May 24, 2006

(86) PCT No.: PCT/JP2006/310320

§ 371 (c)(1),
(2), (4) Date: Nov. 21, 2007

(87) PCT Pub. No.: WO2006/126573

PCT Pub. Date: Nov. 30, 2006

(65) Prior Publication Data

US 2009/0230202 A1 Sep. 17, 2009

(30) Foreign Application Priority Data

May 24, 2005 (JP) ............................. 2005-151510

(51) Int. Cl.
*F24F 3/14* (2006.01)
(52) U.S. Cl. .................. 236/44 A; 236/44 C; 62/176.1
(58) Field of Classification Search ................ 62/176.1, 62/232, 238.3, 222, 92, 331; 165/62, 63; 236/44 A, 49.3, 44 C
See application file for complete search history.

(56) References Cited

U.S. PATENT DOCUMENTS 3,153,914 A * 10/1964 Meckler ...................... 62/271
3,989,097 A * 11/1976 Schildknecht ............... 165/228
4,323,191 A * 4/1982 Chiyoda et al. ........... 236/44 A
4,430,864 A * 2/1984 Mathiprakasam .............. 62/94
4,582,123 A * 4/1986 Williams ..................... 165/225
4,711,097 A * 12/1987 Besik ........................... 62/271
5,022,241 A * 6/1991 Wilkinson .................... 62/271
5,070,703 A * 12/1991 Wilkinson ...................... 62/94
5,305,822 A * 4/1994 Kogetsu et al. ............. 165/225
5,345,776 A * 9/1994 Komazaki et al. .......... 62/176.3
5,355,323 A * 10/1994 Bae ............................. 700/276
5,598,715 A * 2/1997 Edmisten ................... 62/176.6
5,887,651 A * 3/1999 Meyer ........................ 165/223
5,887,784 A * 3/1999 Haas ......................... 236/44 A
5,950,442 A * 9/1999 Maeda et al. ................. 62/175
5,984,002 A * 11/1999 Kido et al. .................. 165/228
6,029,464 A * 2/2000 Kil et al. ....................... 62/173
6,070,110 A * 5/2000 Shah et al. ................... 700/278
6,755,035 B1 * 6/2004 McNamara et al. ........... 62/175
6,826,920 B2 * 12/2004 Wacker ...................... 62/176.6

(Continued)

FOREIGN PATENT DOCUMENTS

JP 2001-201148 A 7/2001

(Continued)

*Primary Examiner*—George Nguyen
(74) *Attorney, Agent, or Firm*—Birch, Stewart, Kolasch & Birch, LLP.

(57) ABSTRACT

In the air conditioning system (1), switching is selectively made between a normal operation where air is dehumidified by the humidity controller (10) alone according to operating conditions and a simultaneous dehumidifying operation where air is dehumidified by the humidity controller (10), while at the same time air is dehumidified by the air conditioner (20) by condensing moisture in the air.

7 Claims, 11 Drawing Sheets

U.S. PATENT DOCUMENTS

| | | | |
|---|---|---|---|
| 6,941,763 B2 * | 9/2005 | Maeda et al. | 62/93 |
| 2003/0061822 A1 * | 4/2003 | Rafalovich | 62/92 |
| 2003/0192331 A1 * | 10/2003 | Alford | 62/173 |
| 2004/0262408 A1 * | 12/2004 | Yabu et al. | 236/44 C |
| 2005/0050906 A1 * | 3/2005 | Dinnage et al. | 62/94 |
| 2005/0061541 A1 * | 3/2005 | Belady | 174/252 |
| 2005/0115254 A1 * | 6/2005 | Knight et al. | 62/176.1 |
| 2005/0269418 A1 * | 12/2005 | Fuller | 236/44 A |
| 2006/0026976 A1 * | 2/2006 | Carpenter | 62/176.1 |
| 2006/0273183 A1 * | 12/2006 | Cavanagh et al. | 236/44 C |
| 2006/0288713 A1 * | 12/2006 | Knight et al. | 62/176.6 |
| 2007/0240437 A1 * | 10/2007 | Yonezawa et al. | 62/176.1 |
| 2007/0257121 A1 * | 11/2007 | Chapman et al. | 236/44 C |

FOREIGN PATENT DOCUMENTS

| | | |
|---|---|---|
| JP | 2003-106609 A | 4/2003 |
| JP | 2004-3864 A | 1/2004 |
| JP | 2004-294048 A | 10/2004 |
| JP | 2005-49059 A | 2/2005 |

\* cited by examiner

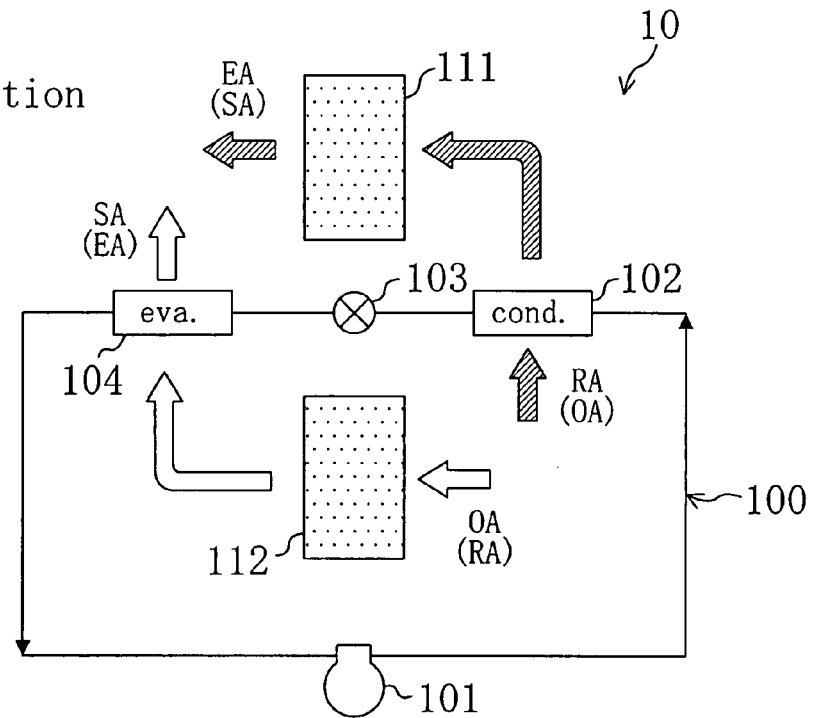
FIG. 9A First operation
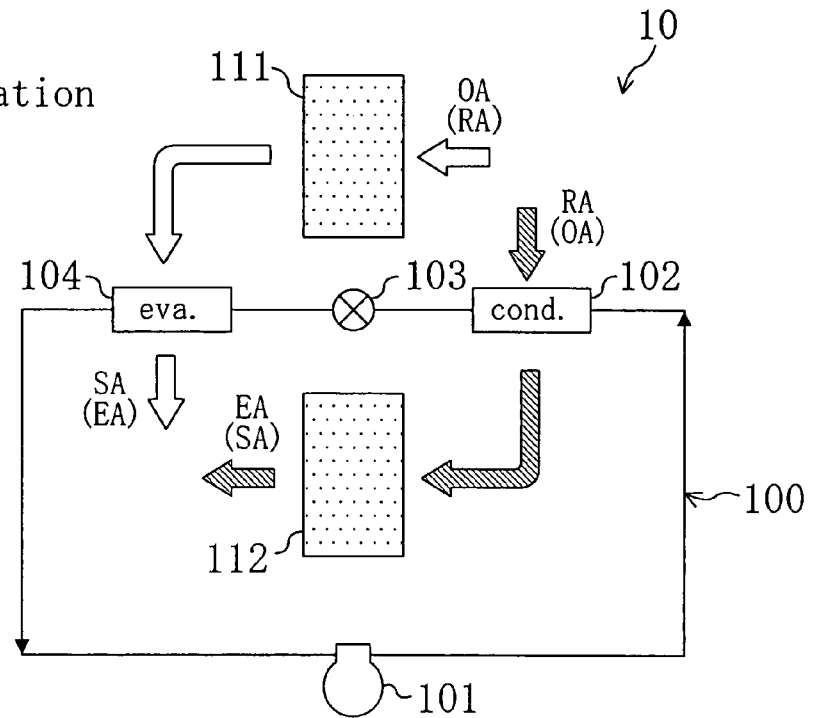
FIG. 9B Second operation

AIR CONDITIONING SYSTEM

TECHNICAL FIELD

The present invention relates to an air conditioning system for supplying to the same room air dehumidified by a humidity controller and air refrigerate by an air conditioner.

BACKGROUND ART

Air conditioners for processing sensible heat of a room by supplying to the room humidity-adjusted air and humidity controllers for processing latent heat a room by supplying to the room humidity-adjusted air have hitherto been known.

For example, there is disclosed in Patent Document 1 an air conditioner in which a refrigerant circulates in a refrigerating circuit to perform a cycle of steam compression and refrigeration. To the refrigerating circuit of the air conditioner, a compressor, a room heat exchanger, an expansion valve, an outdoor heat exchanger, and a four-way selector valve are connected. In this air conditioner, the circulating direction of the refrigerant is reversible through switching of the four-way selector valve, and switching between refrigerating operation and heating operation is made possible. For example, in the refrigerating operation, air conditioned in the room heat exchanger, which serves as an evaporator, is supplied to the room, thus refrigerating the room. In the heating operation, air heated in the room heat exchanger, which serves as a condenser, is supplied to the room, thus heating the room space.

Still further, for example, in Patent Document 2, there is known a humidity controller in which an adsorption heat exchanger supporting an adsorbing agent which performs adsorption of moisture is connected to a refrigerant circuit. This humidity controller is arranged such that the above-mentioned adsorption heat exchanger functions as an evaporator or a condenser as the circulating direction of the refrigerant switches, thereby enabling the operation to switch between the dehumidifying operation and the humidifying operation. For example, in the dehumidifying operation, the adsorbing agent is refrigerated by the refrigerant evaporating in the adsorption heat exchanger. When air passes through the adsorption heat exchanger, the refrigerated adsorbing agent and the air come into contact with one another, with moisture of the air being adsorbed by this adsorbing agent. The air dehumidified by providing moisture to the adsorbing agent is supplied to the room, thereby dehumidifying the room. On the other hand, in the humidifying operation, the adsorbing agent is heated by the refrigerant condensed in the adsorption heat exchanger. When air passes through the adsorption heat exchanger, the heated adsorbing agent and the air come into contact with one another, with the moisture adsorbed in the adsorbing agent being released. The air humidified by containing this moisture is supplied to the room, thereby humidifying the room.

[Patent Document 1] Japanese Unexamined Patent Application Publication No. 2003-106609

[Patent Document 2] Japanese Unexamined Patent Application Publication No. 2004-294048

DISCLOSURE OF THE INVENTION

Problems that the Invention is to Solve

Incidentally, to perform humidity adjustment and heating adjustment of a room simultaneously, an air conditioning system which uses the foregoing air conditioner and the humidity controller jointly in the same room is contemplated. For example, in this air conditioning system, it is possible to refrigerate air by the air conditioner, while at the same time dehumidifying the air by the humidity controller. At this point, at the time of refrigerating dehumidifying operation of this air conditioning system, if the outdoor air humidity increases excessively, the latent heat load to be processed by the humidity controller may increase extremely. As a result, the humidity controller is placed in the state of overload operation, thus lowering the operating efficiency thereof. Consequently, there may be a problem of reducing the efficiency of the air conditioning system or making it impossible to dehumidify the room with certainty.

The present invention bas been made in view of such circumstances. It is the object of the present invention to enable certain, efficient room dehumidification under any operating conditions in an air conditioning system which is equipped with a humidity controller and an air conditioner to carry out refrigeration and dehumidification.

Means of Solving the Problems

A first aspect of the invention is based on an air conditioning system having a humidity controller (10) and an air conditioner (20) and supplying to the same room air dehumidified by the humidity controller (10) and air refrigerated by the air conditioner (20). The air conditioner (20) is configured to be capable of operating to dehumidify air during refrigeration thereof by condensing moisture in the air. A normal operation to dehumidify air by the humidity controller (10) alone and a simultaneous dehumidifying operation to dehumidify air by the humidity controller (10) and the air conditioner (20) are configured to be switchable to one another.

In the first aspect of the invention, refrigeration and dehumidification of a room are simultaneously performed when the humidity controller (10) processes latent heat of air while at the same time the air conditioner (20) processes sensible heat of air. The above-mentioned air conditioner (20) is constructed such as to be able to dehumidify air by condensing moisture in air, for example, by setting the refrigerating temperature to be low.

In the air conditioning system of the present invention, the humidity controller (10) and the air conditioner (20) are controlled in linkage with one another to enable switching between the normal operation and the simultaneous dehumidifying operation. Specifically, in the above-mentioned normal operation, the refrigerating capacity is controlled so that while the humidity controller (10) performs dehumidification of air, the air conditioner (20) carries out only refrigeration of air. That is, in this normal operation, operating control is performed so that sensible heat that is necessary to be handled by this air conditioning system is all handled by the humidity controller (10). On the other hand, in the above-mentioned simultaneous dehumidifying operation, since the humidity controller (10) carries out refrigeration in a way to condense moisture in air, dehumidification and refrigeration of air are both carried out by the humidity controller (10). At the same time, the air conditioner (20) dehumidifies air at a pre-set dehumidifying capacity. That is, in this simultaneous dehumidifying operation, the humidifying amount that is necessary to be handled in this air conditioning system (1) is processed in a shared manner by the humidity controller (10) and the air conditioner (20).

According to a second aspect of the invention, in the first aspect of the invention, the air conditioning system further includes an arithmetic section (43) for estimating an operating efficiency of the humidity controller (10) when air is dehumidified by the humidity controller (10) alone. The normal operation is performed when the operating efficiency of the humidity controller (10) estimated by the arithmetic section (43) is equal to or more than a reference operating efficiency, while the simultaneous dehumidifying operation is performed when the operating efficiency of the humidity controller (10) estimated by the arithmetic section (43) is less than the reference operating efficiency.

In the second aspect of the invention, the arithmetic section (43) is provided in the air conditioning system. When only the humidity controller (10) is used to dehumidify air, the arithmetic section (43) estimates the extent of operating efficiency of the humidity controller (10). The operating efficiency is calculated on the basis of operating conditions (e.g., room temperature and humidity, outdoor temperature and humidity, and room target humidity) at the current point in time of the air conditioning system. Further, in this air conditioning system, the reference operating efficiency is set up as an operating efficiency which can be accomplished as a sufficient operating efficiency by the humidity controller (10).

In the air conditioning system of the present invention, a decision on switching between the above-mentioned normal operation and the simultaneous dehumidifying operation is made by comparison of magnitude between the operating efficiency estimated by the above-mentioned arithmetic section (43) and the above-mentioned reference operating efficiency. Specifically, for example, when, with an operating condition of relatively low outdoor humidity, the operating efficiency estimated by the arithmetic section (43) is equal to or more than the reference operating efficiency, it is estimated that even if the normal operation is carried out under this air conditioning system, the operating efficiency of the humidity controller (10) meets the reference operating efficiency. Consequently, in this case, the normal operation is carried out in the air conditioning system. Conversely, for example, when, with an operating condition of extremely high outdoor humidity, the operating efficiency estimated by the arithmetic section (43) is less than the reference operating efficiency, it is estimated that if the normal operation is carried out in this air conditioning system, the operating efficiency of the humidity controller (10) is unable to attain the reference operating efficiency. Therefore, in this case, the simultaneous dehumidifying operation is carried out in the air conditioning system, and the amount of dehumidification that is necessary to be handled by this air conditioning system is processed by the humidity controller (10) and the air conditioner (20) in a shared manner.

According to a third aspect of the invention, in the second aspect of the invention, during the simultaneous dehumidifying operation, a dehumidifying capacity of the humidity controller (10) is adjusted such that the operating efficiency of the humidity controller (10) becomes the reference operating efficiency.

In the third aspect of the invention, when the simultaneous dehumidifying operation is carried out because the operating efficiency of the humidity controller (10) estimated by the arithmetic section (43) was less than the reference operating efficiency, then the humidity adjusting capacity is adjusted so that the humidity controller (10) may reach the reference operating efficiency. As a result, in the simultaneous dehumidifying operation, such a situation is avoided that the actual operating efficiency of the humidity controller (10) turns out to be less than the reference operating efficiency in the same way as the operating efficiency estimated by the arithmetic section (43).

According to a fourth aspect of the invention, in the first aspect of the invention, the humidity controller (10) is configured to dehumidify outdoor air and supply the dehumidified air to the room, and the normal operation and the simultaneous dehumidifying operation are switched to one another depending on humidity of the outdoor air.

In the fourth aspect of the invention, the humidity controller (10) dehumidifies outdoor air and supplies the dehumidified air to the room. At this point, in this air conditioning system, the above-mentioned normal operation and simultaneous dehumidifying operation are switched to one another on the basis of the humidity of the outdoor air that is to be dehumidified by the humidity controller (10).

Specifically, for example, when the humidity of the outdoor air is not too high, the normal operation is carried out in this air conditioning system. As a result, the amount of dehumidification that is necessary to be handled by this air conditioning system is processed by the humidity controller (10) alone. On the other hand, when the humidity of the outdoor air is extremely high, the simultaneous dehumidifying operation is performed in this air conditioning system. As a result, the amount of dehumidification that is necessary to be handled by this air conditioning system is processed by both the humidity controller (10) and the air conditioner (20).

According to a fifth aspect of the invention, in the first aspect of the invention, the humidity controller (10) includes a refrigerant circuit (50) having a compressor of variable capacity, and adsorbing members (51 and 52) on which an adsorbing agent is supported, the humidity controller being configured to dehumidify air that comes into contact with the adsorbing agent of the adsorbing members (51 and 52) refrigerated by the refrigerant of the refrigerant circuit (50). The air conditioning system further includes an arithmetic section (43) for estimating an operating efficiency of the humidity controller (10) when air is dehumidified by the humidity controller (10) alone. The normal operation is performed when the operating efficiency of the humidity controller (10) estimated by the arithmetic section (43) is equal to or more than a reference operating efficiency, while the simultaneous dehumidifying operation is performed when the operating efficiency of the humidity controller (10) estimated by the arithmetic section (43) is less than the reference operating efficiency.

The humidity controller (10) of the fifth aspect of the invention is provided with the refrigerant circuit (50) performing a freezing cycle in which the refrigerant circulates. Further, the adsorbing members (51 and 52) on which the adsorbing agent is supported so as to dehumidify air is provided in the humidity controller (10). The adsorbing agent of the adsorbing members (51 and 52) is refrigerated through an evaporating refrigerant of the refrigerant circuit (50).

The air processed by the humidity controller (10) comes into contact with the refrigerated adsorbing agent. As a result, moisture in the air is adsorbed by the adsorbing agent, thereby dehumidifying the air. In this humidity controller (10), by adjusting the operating frequency of the compressor (53), the amount of refrigerant circulating in the refrigerant circuit (50) is altered. As a result, the amount of absorbed heat deprived from the adsorbing agent to the refrigerant is altered, thereby adjusting the adsorbing capacity of moisture by the absorbing agent.

At this point, when dehumidifying air by the humidity controller (10) alone as in the case of the second aspect of the invention, the arithmetic section (43) makes a prediction as to a possible extent of the operating efficiency of this humidity controller (10). Also, a decision on switching between the above-mentioned normal operation and the simultaneous dehumidifying operation is made by comparison of magnitude between the operating efficiency estimated by the above-mentioned arithmetic section (43) and the above-mentioned reference operating efficiency. Specifically, for example, if the operating efficiency estimated by the arithmetic section (43) is equal to or more than the above-mentioned reference operating efficiency under an operating condition of relatively low humidity, it is predicted that even if the normal operation is carried out in this air conditioning system, the operating efficiency of the humidity controller (10) meets the reference operating efficiency. Hence, in this case, the normal operation is carried out in the air conditioning system. Conversely, for example, if the operating efficiency estimated by the arithmetic section (43) is less than the above-mentioned reference operating efficiency in an operating condition of extremely high humidity, it is predicted that if the normal operation is carried out in this air conditioning system, the operating efficiency of the humidity controller (10) may not meet the reference operating efficiency. Hence, in this case, the simultaneous dehumidifying operation is carried out in the air conditioning system, and the amount of dehumidification that is necessary to be handled by this air conditioning system is processed by the humidity controller (10) and the air conditioner (20) in a shared manner.

According to a sixth aspect of the invention, in the first aspect of the invention, the humidity controller (10) includes a refrigerant circuit (50) having a compressor of variable capacity, and adsorbing members (51 and 52) on which an adsorbing agent is supported, the humidity controller being configured to dehumidify air that comes into contact with the adsorbing agent of the adsorbing members (51 and 52) refrigerated by the refrigerant of the refrigerant circuit (50). The air conditioning system further includes an arithmetic section (43) for estimating an operating frequency of the humidity controller (10) when air is dehumidified by the humidity controller (10) alone. The normal operation is performed when the operating frequency of the humidity controller (10) estimated by the arithmetic section (43) is less than an upper limit frequency, while the simultaneous dehumidifying operation is performed when the operating frequency of the humidity controller (10) estimated by the arithmetic section (43) is equal to or more than the reference operating frequency.

In the sixth aspect of the invention, the humidity controller (10) is configured in the same manner as the fifth aspect of the invention. On the other hand, as opposed to the fifth aspect of the invention, in the case of dehumidifying air by the humidity controller (10) alone, the arithmetic section (43) makes a prediction as to a possible extent of the operating frequency of the compressor (53) of this humidity controller (10). This operating frequency is calculated on the basis of operating conditions (e.g., room temperature and humidity, outdoor temperature and humidity, and room target humidity) at the current point in time of the air conditioning system. Further, in this air conditioning system, the upper limit frequency is set up to efficiently operate the compressor (53) and the humidity controller (10).

In this air conditioning system, a decision on switching between the above-mentioned normal operation and the simultaneous dehumidifying operation is made by comparison of magnitude between the operating frequency of the compressor (53) estimated by the above-mentioned arithmetic section (43) and the upper limit frequency. Specifically, for example, if the operating frequency of the compressor (53) estimated by the arithmetic section (43) is less than the upper limit frequency under an operating condition of relatively low humidity, it is predicted that even if the normal operation is carried out in this air conditioning system, the efficiency of the compressor (53) and the humidity controller (10) will not deteriorate. Hence, in this case, the normal operation is carried out in the air conditioning system. Conversely, for example, if the operating frequency of the compressor (53) efficiency estimated by the arithmetic section (43) is equal to or more than the above-mentioned reference upper limit frequency under an operating condition of extremely high humidity, it is predicted that if the normal operation is carried out in this air conditioning system, the efficiency of the compressor (53) and the humidity controller (10) may deteriorate. Hence, in this case, the simultaneous dehumidifying operation is carried out in the air conditioning system, and the amount of dehumidification that is necessary to be handled this air conditioning system is processed by the humidity controller (10) and the air conditioner (20) in a shared manner.

EFFECTS OF THE INVENTION

In the present invention, the humidity controller (10) and the air conditioner (20) are controlled in linkage with one another, thus enabling switching between the normal operation and the simultaneous dehumidifying operation. Consequently, even when the amount of dehumidification that is necessary to be handled by this air conditioning system is extremely large, by performing the above-mentioned simultaneous dehumidifying operation, this necessary amount of dehumidification can be processed by the humidity controller (10) and the air conditioner (20) in a shared manner. Further, if the amount of dehumidification that is necessary to be handled by this air conditioning system is not too large, by performing the above-mentioned normal operation, this necessary amount of dehumidification can be reliably processed by the humidity controller (10). As described above, according to the present invention, depending on the operating conditions of the air conditioning system, switching between the normal operation and the simultaneous dehumidifying operation can be made, so that under any operating conditions, this air conditioning system can dehumidify air surely and efficiently.

Particularly, according to the above-mentioned second aspect of the invention, the operating efficiency of the humidity controller (10) estimated by the arithmetic section (43) is compared with the reference operating efficiency, and on the basis of the results of such comparison, switching between the normal operation and the simultaneous dehumidifying operation can be automatically made. Specifically, under operating conditions where the operating efficiency estimated by the arithmetic section (43) is equal to or more than the reference operating efficiency, the normal operation is carried out, so that dehumidification by the humidity controller (10) alone can surely and efficiently process the amount of dehumidification that is necessary to be handled by this operating system. On the other hand, under operating conditions where the operating efficiency estimated in the arithmetic section (43) falls below the reference operating efficiency, the simultaneous dehumidifying operation is carried out, so that the amount of dehumidification that is necessary to be handled by this operating system can be processed by both the humidity controller (10) and the air conditioner (20) in a shared manner. That is, in the present invention, when the necessary amount of dehumidification to be processed by this air conditioning system (1) becomes large, the simultaneous dehumidification operation is carried out automatically, so that under any operating conditions, this air conditioning system (1) can dehumidify air surely and efficiently.

Further, according to the above-mentioned third aspect of the invention, in the simultaneous dehumidification operation, such a situation is avoided with certainty that the actual operating efficiency of the humidity controller (10) in the simultaneous dehumidifying operation falls below the reference operating efficiency as in the case of the operating efficiency estimated by the arithmetic section (43). That is, according to the present invention, overload operation of the humidity controller (10) can be prevented with certainty, therefore, making it possible to avoid the deterioration of the efficiency of this air conditioning system.

In the above-mentioned fourth aspect of the invention, switching between the normal operation and the simultaneous dehumidifying operation can be made automatically on the basis of the humidity of outdoor air that is to be dehumidified by the humidity controller (10). Consequently, even if the humidity of the outdoor air fluctuate so that the necessary amount of dehumidification to be processed by the air conditioning system varies greatly, effective dehumidification of air suitable to this condition can be performed.

In the above-mentioned fifth aspect of the invention, air is dehumidified by the adsorbing agent of the adsorbing members (51 and 52) of the humidity controller (10). At this point, in this air conditioning system, the operating efficiency estimated by the arithmetic section (43) is compared with the reference operating efficiency, thereby enabling switching between the normal operation and the simultaneous dehumidifying operation to be made automatically. Hence, in this air conditioning system, air can be dehumidified surely and efficiently under any operating conditions.

Further, in the above-mentioned sixth aspect of the invention, in the air conditioning system having the humidity controller (10) of the same configuration as the fifth aspect of the invention, a comparison is made between the operating frequency of the compressor (53) estimated by the arithmetic section (43) and the upper limit frequency so that the normal operation and the simultaneous dehumidifying operation may be automatically switched to one another. Consequently, under any operating conditions, the compressor (53) and the humidity controller (10) can be efficiently operated and air can be efficiently dehumidified in this air conditioning system.

BRIEF DESCRIPTION OF THE DRAWINGS

FIG. 9 is a schematic block diagram of a humidity controller in a modified example 1 of another embodiment; (A) shows operation during a first operation, and (B) shows operation during a second operation.

REFERENCE NUMERAL

Figure 1:
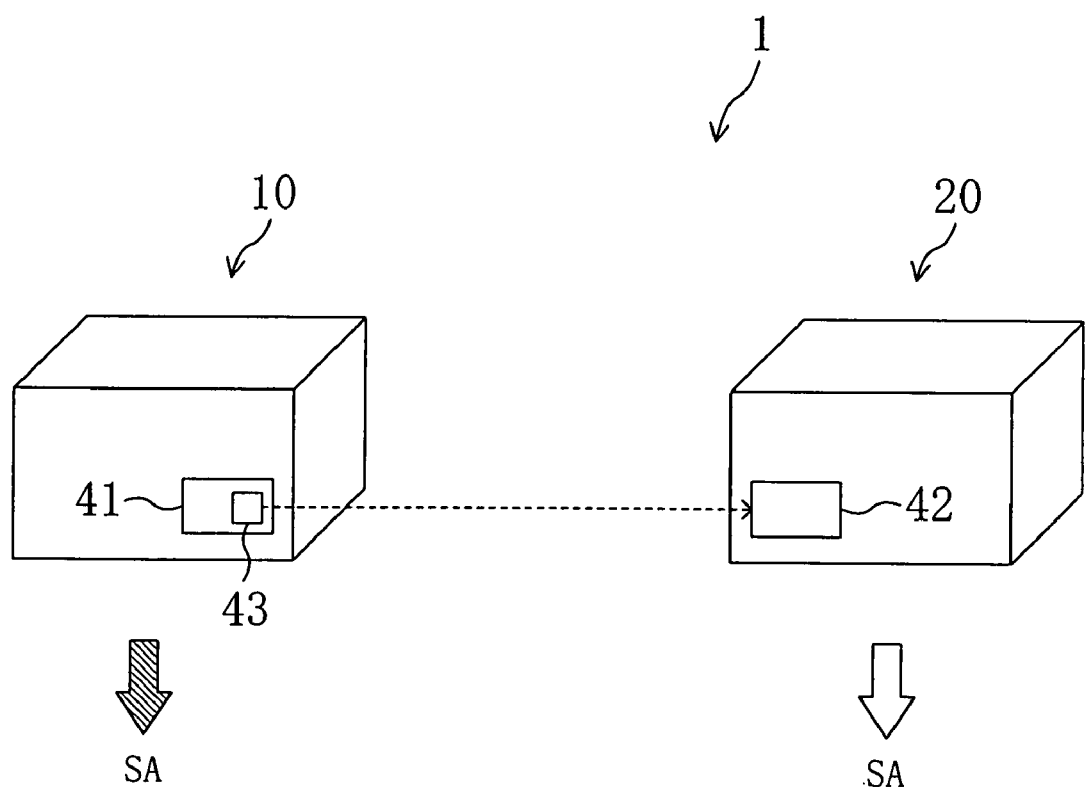
FIG. 1 is a schematic block diagram of an air conditioning system of an embodiment.

1 Air conditioning system
10 Humidity controller
20 Air conditioner
41 Air conditioning section (control means)
42 Humidity adjustment section (control means)
43 Arithmetic section
50 Refrigerant circuit
51 Adsorption member
52 Adsorption member
53 Compressor

BEST MODE FOR CARRYING OUT THE INVENTION

Embodiments of the present invention will be described. As shown in FIG. 1, an air conditioning system (1) of this embodiment has a humidity controller (10) and an air conditioner (20) In this air conditioning system (1), air processed by the humidity controller (10) and air processed by the air conditioning system (20) are both supplied to the same room. Further, this air conditioning system (1) is provided with a humidity adjustment section (41) and an air conditioning section (42) as control means of the humidity controller (10) and the air conditioner (20).

<Schematic Configuration of the Humidity Controller>

The humidity controller (10) of this embodiment is configured to be capable of running dehumidifying operation to supply dehumidified air to the room and humidifying operation to supply humidified air to the room.

Figure 2:
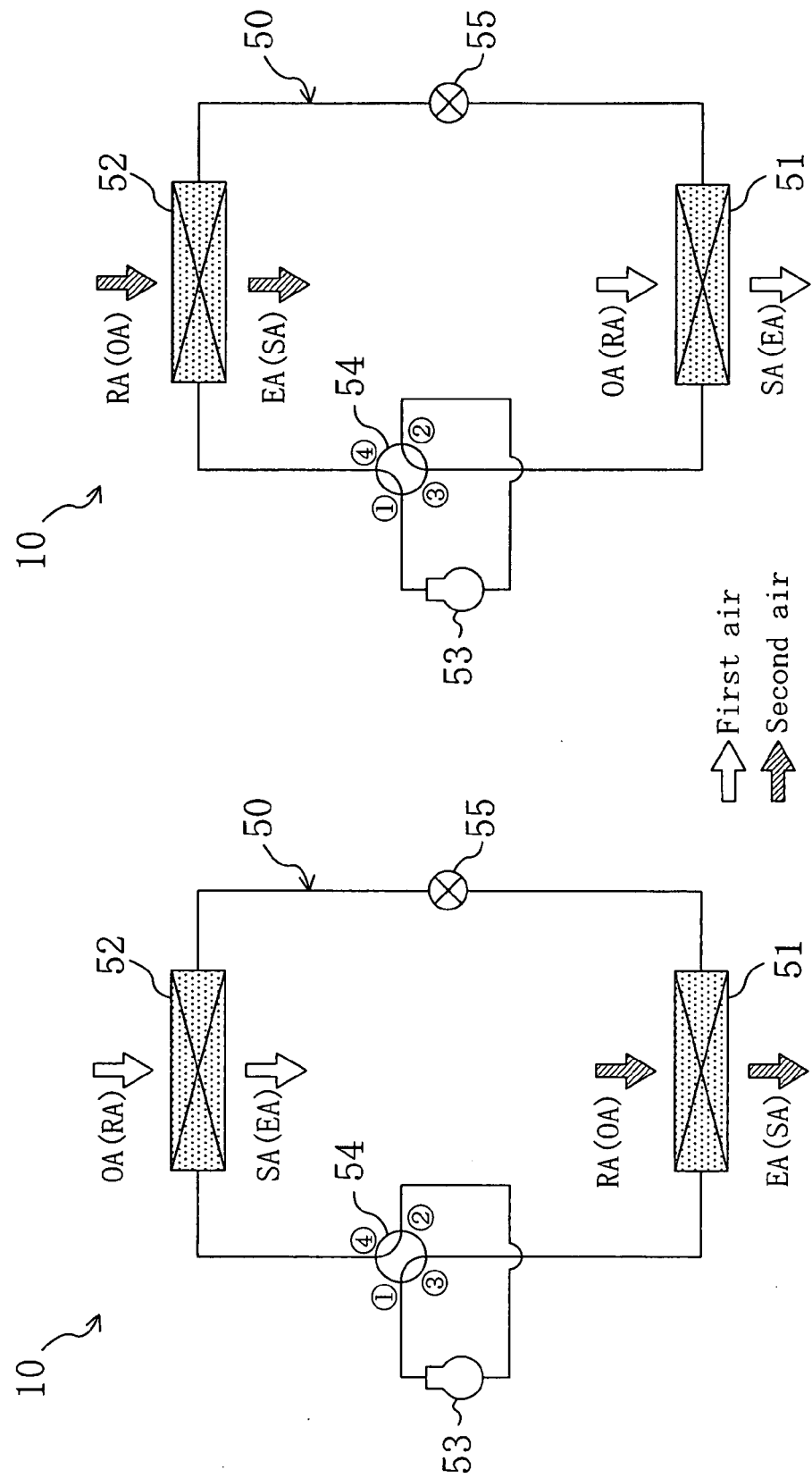
FIG. 2 is a piping system diagram illustrating construction of a refrigerant circuit of a humidity controller of an embodiment; (A) shows operation during a first operation, and (B) shows operation during a second operation.

As shown in FIG. 2, the above-mentioned humidity controller (10) is provided with a refrigerant circuit (50). This refrigerant circuit (50) is a closed circuit provided with a first adsorption heat exchanger (51), a second adsorption heat exchanger (52), a compressor (53), a four-way selector valve (54), and a motorized expansion valve (55). By circulating a filled refrigerant, the refrigerant circuit (50) performs a steam compression freezing cycle.

In the above refrigerant circuit (50), an ejection side of the compressor (53) is linked to a first port of the four-way selector valve (54), while a suction side of the compressor (53) is linked to a second port of the four-way selector valve (54). One end of the first adsorption heat exchanger (51) is linked to a third port of the four-way selector valve (54). The other end of the first adsorption heat exchanger (51) is linked via the motorized expansion valve (55) to one end of the second adsorption heat exchanger (52). The other end of the second adsorption heat exchanger (52) is linked to a fourth port of the four-way selector valve (54).

The above-mentioned four-way selector valve (54) is such that a first condition (condition shown in FIG. 2(A)) in which the first port and the third port are in communication while the second port and the fourth port are in communication can be switched to a second condition (condition shown in FIG.

2(B)) in which the first port and the fourth port are in communication while the second port and the third port are in communication.

Figure 3:
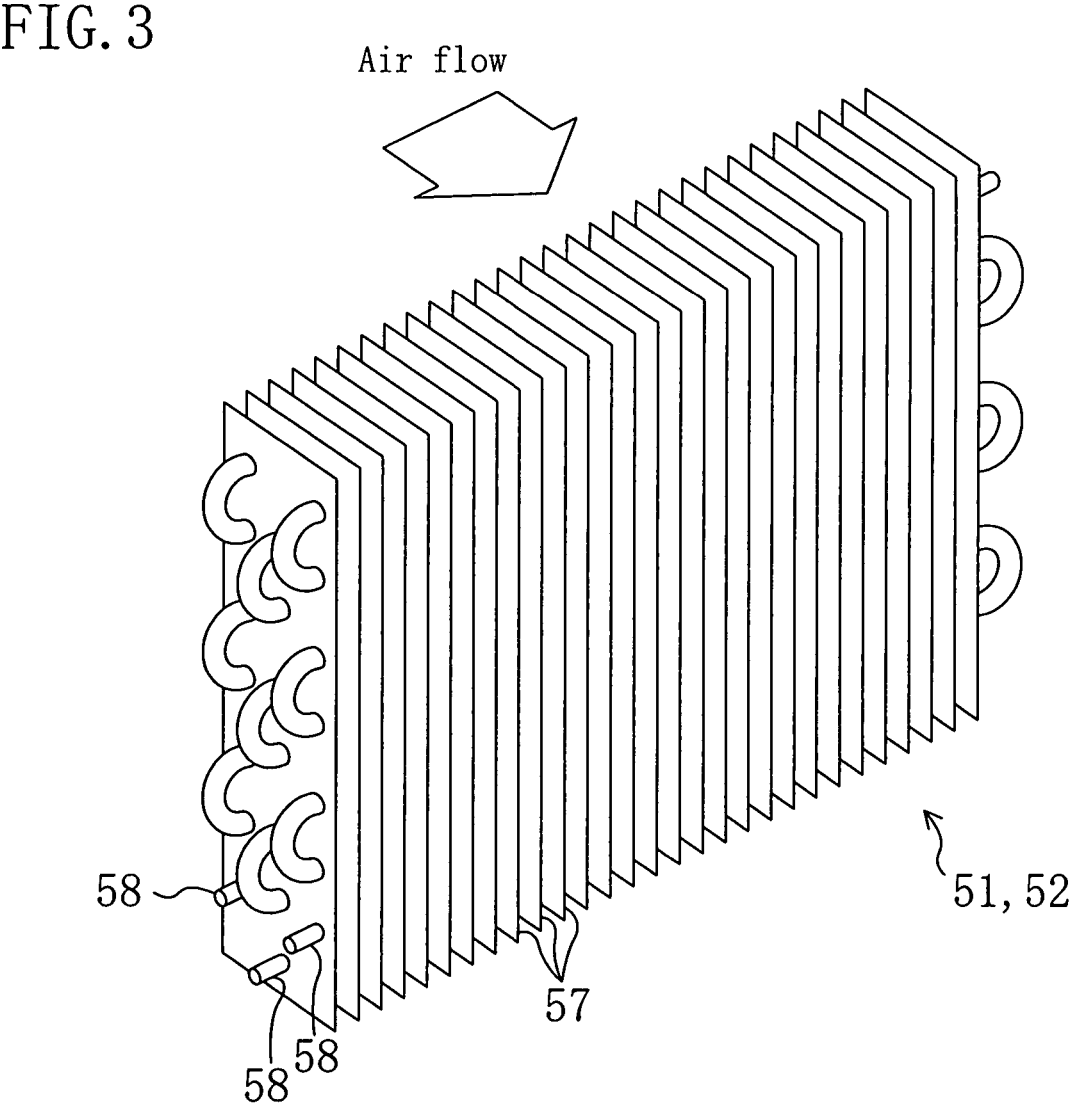
FIG. 3 is a schematic perspective view of an adsorption heat exchanger.

As shown in FIG. 3, the first adsorption heat exchanger (51) and the second adsorption heat exchanger (52) are both constituted of a fin and tube heat exchanger of the cross fin type. These adsorption heat exchangers (51 and 52) are provided with copper heat transfer pipes (58) and aluminum-made fins (57). A plurality of fins (57) set up on the adsorption heat exchangers (51 and 52) are respectively formed in an oblong plate shape and arranged at a preset spacing. Further, the heat transfer pipes (58) are provided to pierce through the fins (57).

In each of the above-mentioned adsorption heat exchangers (51 and 52), the adsorbing agent is supported on the surface of each fin (57) to constitute the adsorption member of the invention. Air passing through the fins (57) of the adsorption heat exchangers (51 and 52) comes into contact with the adsorbing agent on the surface of the fins (57). As the adsorbing agent, there are employed those materials which can adsorb moisture vapor in air such as zeolite, silica gel, activated charcoal, and any other organic high-molecule material having a hydrophilic functional group.

Further, the humidity controller (10) is provided with a plurality of sensors, not shown, for measuring air temperature and humidity. These plurality of sensors are constituted of an outdoor temperature sensor detecting the temperature of outdoor air, an outdoor humidity sensor detecting the relative humidity of outdoor air, a room temperature sensor detecting the temperature of room air, and a room humidity sensor detecting the relative humidity of the room air.

<Schematic Configuration of the Air Conditioner>

The air conditioner (20) of this embodiment is so configured as to enable air conditioning operation to supply refrigerated air to the room and heating operation to supply heated air to the room.

As shown in FIG. 4, the above-mentioned air conditioner (20) has a room unit (21) and an outdoor unit (22). The room unit (21) is arranged in the room, and a room heat exchanger (62) is housed in this room unit (21). On the other hand, the above-mentioned outdoor unit (22) is arranged outdoors. This outdoor unit (22) houses an outdoor heat exchanger (61), a compressor (63), a four-way selector valve (64), and a motorized expansion valve (65). The above-mentioned room unit (21) and the above-mentioned outdoor unit (22) are mutually linked by two connecting pipes (23 and 24). This air conditioner (20) is constituted of a refrigerant circuit (60) which is a closed circuit. This refrigerant circuit (60) performs a steam-pressure compression freezing cycle by circulating filled refrigerant.

In the above-mentioned refrigerant circuit (60), the compressor (63) is coupled such that its ejection side is coupled to the first port of the four-way selector valve (64) while its suction side is coupled to the second port thereof. One end of the outdoor heat exchanger (61) is coupled to the third port of the four-way selector valve (64), while the other end of the outdoor heat exchanger (61) is coupled via the motorized expansion valve (65) to one end of the room heat exchanger (62). The other end of the room heat exchanger (62) is coupled to the fourth port of the four-way selector valve (64).

Figure 4A:
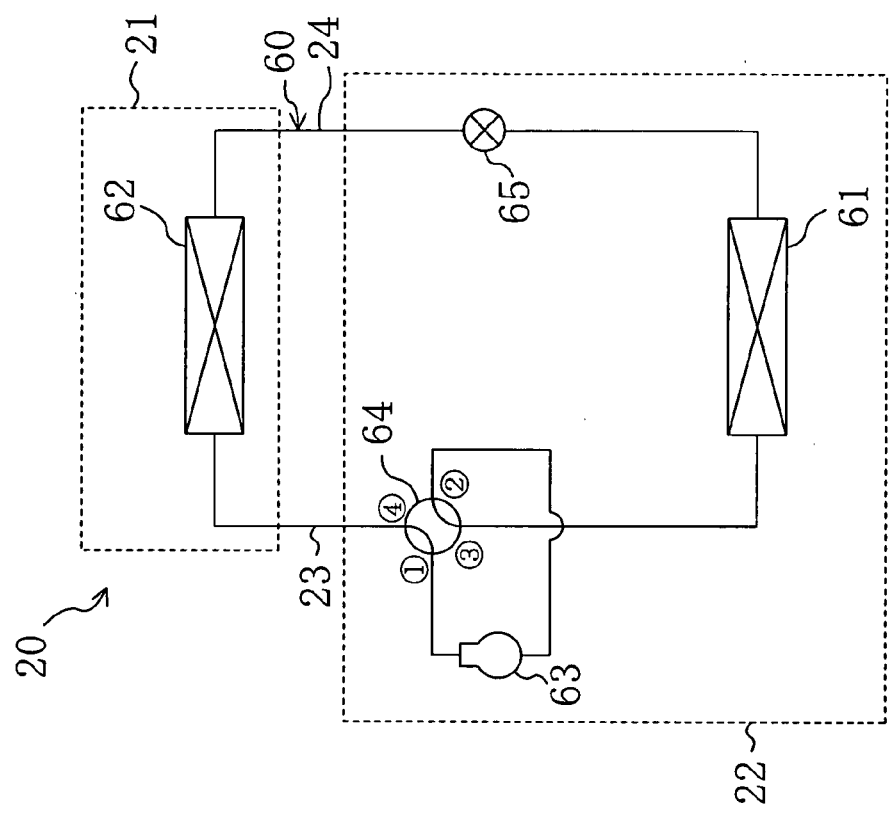
FIG. 4 is a piping system diagram showing construction of a refrigerant circuit of an air conditioning system of an embodiment, (A) shows the first condition, and (B) shows the second condition.
Figure 4B:
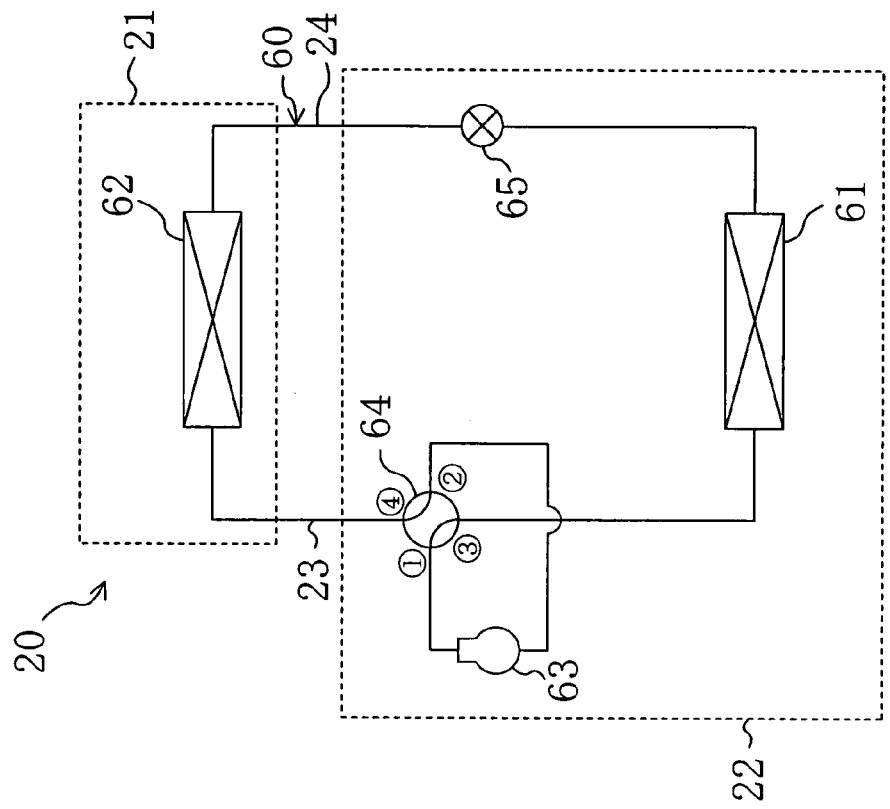

The above-mentioned four-way selector valve (64) is such that a first condition (condition shown in FIG. 4(A)) in which the first port and the third port are in communication while the second port and the fourth port are in communication can be switched to a second condition (condition shown in FIG. 4(B)) in which the first port and the fourth port are in communication while the second port and the third port are in communication. Further, the air conditioner (20) is provided with a suction temperature sensor for detecting the temperature of air to be sucked into the air conditioner (20).

<Configuration of the Humidity Adjustment Section and the Air Conditioning Control Section>

As shown in FIG. 1, the humidity adjustment section (41) and the air conditioning control section (42) are provided in the air conditioning system (1) of this embodiment.

The above-mentioned humidity adjustment section (41) controls the humidity adjusting capacity of the humidity controller (10). Specifically, the humidity adjustment section (41) controls the operating frequency of the compressor (53) of the humidity controller (10) according to operating conditions and adjusts the circulating amount of refrigerant of the refrigerant circuit (50). As a result, a heat absorbing amount and a heat release amount of the refrigerant in the adsorbing heat exchangers (51 and 52) are altered, thereby adjusting the humidity adjusting capacity of the humidity controller (10).

A target temperature of the room (set temperature) is inputted via a controller, not shown, into the air conditioning system (1). Depending on the set temperature, a target humidity of the room is automatically determined in the air conditioning system (1). The humidity adjusting capacity of the humidity controller (10) is adjusted so that the room humidity may come very close to the above-mentioned target humidity.

The above-mentioned air conditioning control section (42) adjusts the temperature controlling capacity of the air conditioner (20). Specifically, the air conditioning control section (42) controls the operating frequency of the compressor (63) depending on operating conditions to adjust the circulating amount of refrigerant of the refrigerant circuit (60). Further, depending on operating conditions, the air conditioning control section (42) adjusts a refrigerant evaporating temperature and a refrigerant condensing temperature of the room heat exchanger (62). As a result, the heat absorbing amount and the heat release amount of the refrigerant in the room heat exchanger (62) are adjusted, and thus the temperature controlling capacity of the air conditioner (20) is adjusted. The temperature controlling capacity of the air conditioner (20) is adjusted such that the room temperature may come very close to the above-mentioned set temperature.

Further, the air conditioner (20) is so configured as to be able to operate to dehumidify air by condensing moisture in the air when refrigerating the air by the room heat exchanger (62) by decreasing the evaporating temperature of the room heat exchanger (62) to a pre-set temperature in the refrigerating operation.

This air conditioning system (1) provides a refrigerating dehumidifying operation such that the humidity controller (10) performs the dehumidifying operation, while at the same time the air conditioner (20) performs the refrigerating operation. Further, in this refrigerating dehumidifying operation, switching is made possible between the normal operation and the simultaneous dehumidifying operation. The above-mentioned normal operation is an operation where the humidity controller (10) alone performs dehumidification of air, while the air conditioner (20) carries out refrigeration of air. On the other hand, the above-mentioned simultaneous dehumidifying operation is an operation where the humidity controller (10) performs dehumidification of air, while the air conditioner (20) carries out dehumidification and refrigeration of air. In the refrigerating dehumidifying operation of the air conditioning system (1), switching of these two kinds of operation is automatically performed. The switching of these two kinds of operation is performed on the basis of the results of calculations of the arithmetic section (43), which is provided in the humidity adjustment section (41) (detailed later).

—Operation—

<Operation of the Humidity Controller>

As shown in FIG. 2, In the humidity controller (10) of this embodiment, the dehumidifying operation and the humidifying operation are performed. When in the dehumidifying operation and the humidifying operation, the humidity controller (10) subjects taken-in outdoor air to humidity adjustment, then supplies such air as supply air (SA) to the room, while, at the same time, ejecting the taken-in room air (RA) as ejected air (EA). Namely, the humidity controller (10) in the dehumidifying operation and the humidifying operation performs air ventilation. Further, the humidity controller (10) alternately repeats the first operation and the second operation at preset time intervals (e.g., 3-minute intervals) during either the dehumidifying operation or the humidifying operation.

The humidity controller (10) takes in, during the dehumidifying operation, outdoor air (OA) as the first air and room air (RA) as the second air. Further, the humidity controller (10) takes in, during the humidifying operation, room air (RA) as the first air and outdoor air (OA) as the second air.

First, the first operation will be described. During the first operation, the second air is sent to the first adsorption heat exchanger (51) and the first air is sent to the second adsorption heat exchanger (52). In this first operation, regenerating action is performed regarding the first adsorption heat exchanger (51) and adsorption action is performed regarding the second adsorption heat exchanger (52).

As shown in FIG. 2(A), in the refrigerant circuit (50) during the first operation, the four-way selector valve (54) is set in the first condition. When the compressor (53) is operated, the refrigerant circulates in the refrigerant circuit (50). Specifically, the refrigerant ejected from the compressor (53) releases heat in the first adsorption heat exchanger (51) to be condensed. The refrigerant condensed in the first adsorption heat exchanger (51) is depressurized when passing through the motorized expansion valve (55), thereafter absorbing heat in the second adsorption heat exchanger (52) to be evaporated. The refrigerant evaporated in the second adsorption heat exchanger (52) is sucked into the compressor (53) and compressed, and again ejected from the compressor (53).

In this manner, in the refrigerant circuit (50) during the first operation, the first adsorption heat exchanger (51) operates as the condenser, while the second adsorption heat exchanger (52) operates as the evaporator. In the first adsorption heat exchanger (51), the adsorbing agent on the surfaces of the fins (57) is heated by the refrigerant in the heat transfer pipe (58), so that moisture desorbed from the heated adsorbing agent is provided to the second air. On the other hand, in the second adsorption heat exchanger (52), moisture in the first air is adsorbed by the adsorbing agent on the surfaces of the fins (57), and the generated adsorption heat is absorbed by the refrigerant in the heat transfer pipe (58).

Then, if during the dehumidifying operation, the first air dehumidified in the second adsorption heat exchanger (52) is supplied to the room, while the moisture desorbed from the first adsorption heat exchanger (51) is ejected outdoors together with the second air. On the other hand, if during the humidifying operation, the second air humidified in the first adsorption heat exchanger (51) is supplied to the room, while the first air deprived of moisture in the second adsorption heat exchanger (52) is ejected outdoors.

Next, the second operation will be described. During the second operation, the first air is sent to the first adsorption heat exchanger (51) and the second air is sent to the second adsorption heat exchanger (52). In this second operation, regenerating action is performed regarding the second adsorption heat exchanger (52) and adsorption action is performed regarding the first adsorption heat exchanger (51).

As shown in FIG. 2(B), in the refrigerant circuit (50) during the second operation, the four-way selector valve (54) is set in the second condition. When the compressor (53) is operated, the refrigerant circulates in the refrigerant circuit (50). Specifically, the refrigerant ejected from the compressor (53) releases heat in the second adsorption heat exchanger (52) to be condensed. The refrigerant condensed in the second adsorption heat exchanger (52) is depressurized when passing through the motorized expansion valve (55), thereafter absorbing heat in the first adsorption heat exchanger (51) to be evaporated. The refrigerant evaporated in the first adsorption heat exchanger (51) is sucked into the compressor (53) and compressed, and again ejected from the compressor (53).

In this manner, in the refrigerant circuit (50), the second adsorption heat exchanger (52) operates as the condenser, while the first adsorption heat exchanger (51) operates as the evaporator. In the second adsorption heat exchanger (52), the adsorbing agent on the surfaces of the fins (57) is heated by the refrigerant in the heat transfer pipe (58), while moisture released from the heated adsorbing agent is provided to the second air. On the other hand, in the first adsorption heat exchanger (51), moisture in the first air is adsorbed by the adsorbing agent on the surfaces of the fins (57), and the generated adsorption heat is absorbed by the refrigerant in the heat transfer pipe (58).

Then, if during the dehumidifying operation, the first air dehumidified in the first adsorption heat exchanger (51) is supplied to the room, while the moisture released from the second adsorption heat exchanger (52) is ejected outdoors together with the second air. On the other hand, if during the humidifying operation, the second air humidified in the second adsorption heat exchanger (51) is supplied to the room, and the first air deprived of moisture in the first adsorption heat exchanger (51) is ejected outdoors.

<Operation of the Air Conditioner>

In the air conditioner (20) of the present embodiment, the refrigerating operation and the heating operation are performed.

As shown in FIG. 4(A), the four-way selector valve (64) of the refrigerant circuit (60) is set in the first condition. When the compressor (53) is operated, the refrigerant circulates in the refrigerant circuit (50). Specifically, the refrigerant ejected from the compressor (63) releases heat in the outdoor heat exchanger (61) to be condensed. The refrigerant condensed in the outdoor heat exchanger (61) is depressurized when passing through the motorized expansion valve (65), thereafter absorbing heat in the room heat exchanger (62) to be evaporated. The refrigerant evaporated in the room heat exchanger (62) is sucked into the compressor (63) and compressed, and again ejected from the compressor (63).

In this manner, in the refrigerant circuit (60), the outdoor heat exchanger (61) operates as the condenser, and the room heat exchanger (62) operates as the evaporator. On the other hand, air sucked from the room into the air conditioner (20) passes through the room heat exchanger (62) which operates as the evaporator. This air, after being refrigerated in the room heat exchanger (62), is supplied to the room.

On the other hand, in the heating operation of the air conditioner (20), as shown in FIG. 4(B), the four-way selector valve (64) of the refrigerant circuit (60) is set in the second condition. When the compressor (63) is operated, the refrigerant circulates in the refrigerant circuit (60). Specifically, the refrigerant ejected from the compressor (63) releases heat in the room heat exchanger (62) to be condensed. The refrigerant condensed in the room heat exchanger (62) is depressurized when passing through the motorized expansion valve (65), thereafter absorbing heat in the outdoor heat exchanger (61) to be evaporated. The refrigerant evaporated in the outdoor heat exchanger (61) is sucked into the compressor (63) and compressed, and again ejected from the compressor (63).

In this manner, in the refrigerant circuit (60), the outdoor heat exchanger (61) operates as the evaporator, and the room heat exchanger (62) operates as the condenser. On the other hand, air sucked from the room into the air conditioner (20) passes through the room heat exchanger (62), which operates as the condenser. This air, after being heated in the room heat exchanger (62), is supplied to the room.

<Control Operation of the Refrigerating Dehumidifying Operation>

In the air conditioning system (1) of this embodiment, by combining the dehumidifying operation or the humidifying operation of the humidity controller (10) mentioned above and the refrigerating operation or the heating operation of the air conditioner (20) mentioned above, four combinations of operations are performed. Specifically, in the air conditioning system (1), the "refrigerating dehumidifying operation," the "heating humidifying operation," the "refrigerating humidifying operation," and the "heating dehumidifying operation" can be switched to each other.

In the above-mentioned refrigerating dehumidifying operation, while performing the dehumidifying operation by the humidity controller (10), refrigeration of air is simultaneously performed by the air conditioner (20). Incidentally, when performing such refrigerating dehumidifying operation, for example, if the outdoor air humidity should increase to extremely high levels, and thus the amount of dehumidification that is necessary to be processed by this air conditioning system (1) should increase, then this has conventionally lead the humidity controller (10) to overload operation, thus posing possibilities including lowering of the operating efficiency of this air conditioning system (1) and difficulty in maintaining the room humidity at the target humidity. To solve this problem, at the time of the refrigerating dehumidifying operation of the air conditioning system (1) of this embodiment, switching is made between the "normal operation" and the "simultaneous dehumidifying operation" as mentioned above according to operating conditions.

Figure 5:
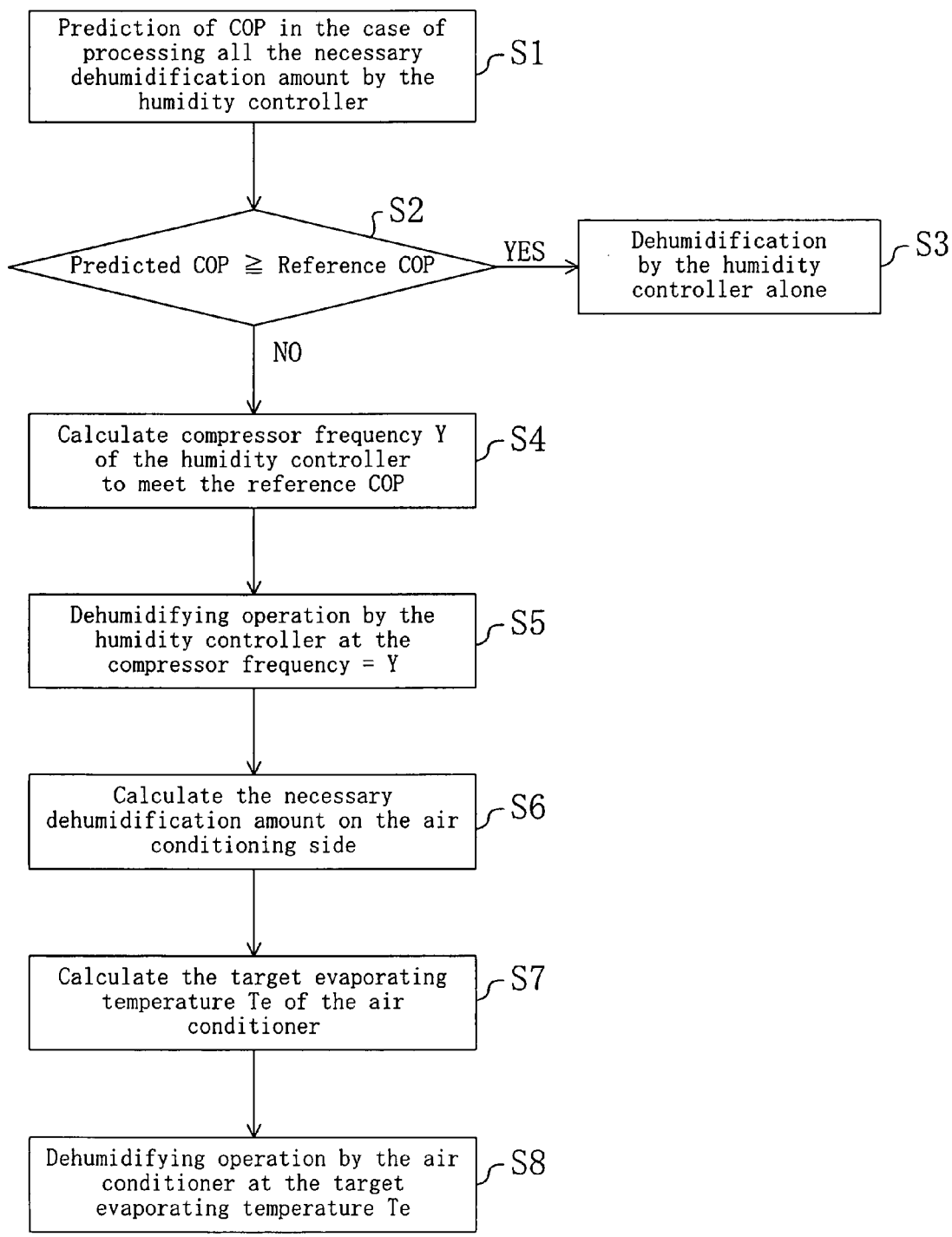
FIG. 5 is a schematic control flow chart showing control operation of the refrigerating dehumidifying operation of an air conditioning system of an embodiment.

With reference to FIG. 5, switching control operation between the normal operation and the simultaneous dehumidifying operation at the time of the refrigerating dehumidifying operation of the air conditioning system (1) of this embodiment will be described below.

In step S1, the arithmetic section (43) calculates the necessary dehumidifying amount to be processed by this air conditioning system (1) on the basis of operating conditions. Specifically, this necessary dehumidifying amount is calculated on the basis of the outdoor temperature and humidity detected by the outdoor temperature sensor and the outdoor humidity sensor, the room temperature and humidity detected by the room temperature sensor and the room humidity sensor, and the target humidity of the air conditioning system (1). Further, the arithmetic section (43) calculates the operating efficiency of the humidity controller (10) in the case of processing this necessary dehumidifying amount by the humidity controller (10) alone. Specifically, the arithmetic section (43) stores in advance, in the form of a database, a relationship between the necessary dehumidifying amount of the humidity controller (10) and a COP in the case of processing this necessary dehumidifying amount by the humidity controller (10) alone. Further, the arithmetic section (43) calculates a COP in the case of processing all the necessary dehumidifying amount by the humidity controller (10) by using the above-mentioned database, and a value thus obtained is set as an estimated COP. It is noted that the COP for the humidity controller (10) means a ratio between the power consumption required for operating the humidity controller (10) and the humidity adjusting capacity thereof at the time of operation of the humidity controller (10).

Next, in step S2, the humidity adjustment section (41) makes a decision on switching between the normal operation and the simultaneous dehumidifying operation. Specifically, the humidity adjustment section (41) makes a comparison of magnitude between the estimated COP calculated in step S1 and a pre-set reference COP, and makes switching between the normal operation and the simultaneous dehumidifying operation. It should be noted that the above-mentioned reference COP is a COP which can attain sufficient operating efficiency (reference operating efficiency) with this humidity controller (10), and that this reference COP is set to be 3.5 in this embodiment.

At this point, in step S2, when the estimated COP calculated in step S1 is equal to or more than the reference COP, it is determined that even if the humidity controller (10) alone processes all the necessary dehumidifying amount, high-efficiency dehumidification could be performed by the humidity controller (10). Hence, in this case, a shift is made to step S3, where the normal operation is performed. In this normal operation, the operating frequency of the compressor (53) of the humidity controller (10) is controlled such that the indoor humidity may reach the target humidity, and air dehumidification is performed by the humidity controller (10) alone. In the air conditioner (20) during the normal operation, the refrigeration capacity is controlled such that the room air may come very close to the target temperature and air refrigeration is performed by the air conditioner (20). At that time, in the air conditioner (20), the evaporating temperature of the refrigerant is set higher than the dew point temperature of the room air so as to prevent the room heat exchanger (62) from generating drainage.

On the other hand, in step S2, when the estimated COP calculated in step S1 is less than the reference COP, it is determined that if the humidity controller (10) alone processes all the necessary dehumidifying amount, the operating efficiency of the humidity controller (10) would decrease. Hence, in this case, step S4 is implemented to make a shift to the simultaneous dehumidifying operation.

In step S4, the dehumidifying capacity to operate the humidity controller (10) at the reference COP is calculated, and an operating frequency Y of the compressor (53) to produce such dehumidifying capacity at the humidity controller (10) is calculated. Then in step S5, frequency control is performed to put the frequency of the compressor (53) of the humidity controller (10) as Y. That is, in step S5, the dehumidifying capacity of the humidity controller (10) is controlled such that the actual COP of the humidity controller (10) may not fall below the reference COP in the above operating condition. Further, in step S6, when the humidity adjusting capacity of the humidity controller (10) is changed in the foregoing manner, there is calculated a remaining necessary amount of dehumidification (necessary amount of dehumidification on the air conditioning side) of the entire necessary amount of dehumidification to be processed by the air conditioning system (1), which cannot be processed through dehumidification by the humidity controller (10) alone. That is, in step S6, during the operation to meet the reference COP by the humidity controller (10), the necessary amount of dehumidification to be undertaken by the air conditioner (20) is calculated.

In step S7, the necessary amount of dehumidification on the air conditioning side calculated in the foregoing manner is transmitted from the arithmetic section (43) to the air conditioning control section (42). The air conditioning control section (42) calculates the target evaporating temperature Te of the refrigerant of the room heat exchanger which is needed to process this necessary amount of dehumidification on the air conditioning side by the air conditioner (20). Specifically, this target evaporating temperature Te is calculated on the basis of the above-mentioned necessary amount of dehumidification on the air conditioning side, the target humidity, the room temperature and humidity and the like, and the obtained value is lower than the dew point temperature of the room air.

In step S8, when the refrigerant evaporating temperature of the air conditioner (20) is controlled to the target evaporating temperature Te, moisture in the air processed by the air conditioner (20) condenses, thus dehumidifying this air. The moisture after condensation by the air conditioner (20) is collected in a drain pan and the like to be drained to outside the air conditioner (20) as drainage.

As described above, at the time of the simultaneous dehumidifying operation, air dehumidification to meet the reference COP is carried out by the humidity controller (10). At the same time, the remaining moisture which cannot be processed through dehumidification by the above-mentioned humidity controller (10) is dehumidified, thus eventually maintaining the room temperature at the target humidity.

Effects of the Embodiments

In the above-mentioned embodiment, at the time of the refrigerating dehumidifying operation of the air conditioning system (1), the humidity controller (10) and the air conditioner (20) are controlled in linkage with one another to make switching between the normal operation and the simultaneous dehumidifying operation. Specifically, for example, under the operating condition where the outdoor air humidity is relatively low and thus the COP estimated by the arithmetic section (43) exceeds the reference COP, the normal operation is carried out. At the time of this normal operation, air is dehumidified above the reference COP, making it possible to carry out room dehumidification surely and efficiently.

On the other hand, for example, under the operating condition where the outdoor air humidity is extremely high and thus the COP estimated by the arithmetic section (43) falls below the reference COP, the simultaneous dehumidifying operation is carried out. At the time of this simultaneous dehumidifying operation, dehumidification is performed by both the humidity controller (10) and the air conditioner (20), making it possible to carry out room dehumidification surely and efficiently even under such operating condition.

In particular, in the simultaneous dehumidifying operation, the operating frequency of the compressor (53) is controlled so that the humidity controller (10) may be operated at the reference COP. Accordingly, the actual COP of the humidity controller (10) can be prevented from falling below the reference COP. Further, in the case where the dehumidifying capacity of the humidity controller (10) is restricted in this manner, a remaining necessary amount of humidity adjustment of the entire necessary amount of humidity adjustment to be processed by the air conditioning system (1), which cannot be processed by the humidity controller (10) alone, is calculated as the necessary amount of humidity adjustment on the air conditioning side, and the refrigerant evaporating temperature Te of the air conditioner (20) is controlled so as to enable processing of this necessary amount of humidity adjustment on the air conditioning side. Hence, a highly efficient dehumidifying operation can be performed by the humidity controller (10), while at the same time the necessary amount of humidity adjustment to be processed by the air conditioning system (1) can processed with certainty by the humidity controller (10) and the air conditioner (20) in a shared manner.

MODIFIED EXAMPLES OF CONTROL OPERATION

At the time of the refrigerating dehumidifying operation of the air conditioning system (1), in addition to the foregoing embodiment, control operations of the following modified examples may be performed.

Modified Example 1

Figure 6:
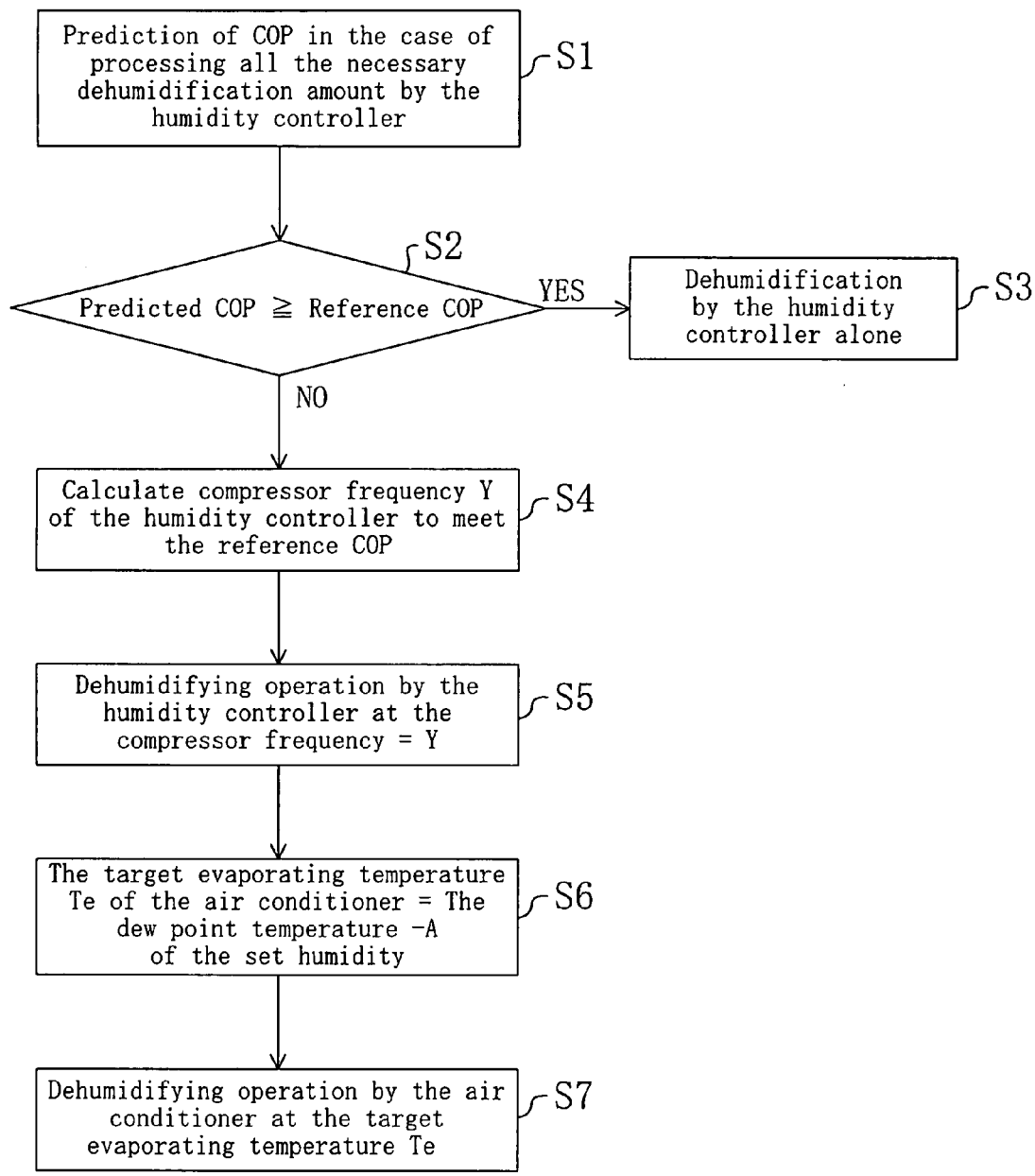
FIG. 6 is a schematic control flow chart showing control operation of the refrigerating dehumidifying operation of an air conditioning system of a modified example 1.

In the control operation of a modified example 1 shown in FIG. 6, a method of calculating the target evaporating temperature Te of the air conditioner (20) in the simultaneous dehumidifying operation is different from the above-mentioned embodiment. Specifically, when the air conditioning system (1) shifts to the simultaneous dehumidifying operation, the dew point temperature of the room target humidity is calculated in step S6. A temperature obtained by subtracting a pre-set temperature A (e.g., 5° C.) from this dew point temperature is determined as the above-mentioned target evaporating temperature Te.

In the control operation of this modified example 1, regardless of the dehumidifying capacity of the humidity controller (10), the refrigerant evaporating temperature of the room heat exchanger (62) of the air conditioner (20) becomes surely under the dew point temperature of air. Hence, in the simultaneous dehumidifying operation, moisture in air is condensed with certainty in the air conditioner (20), thus enabling dehumidification of the air.

Modified Example 2

Figure 7:
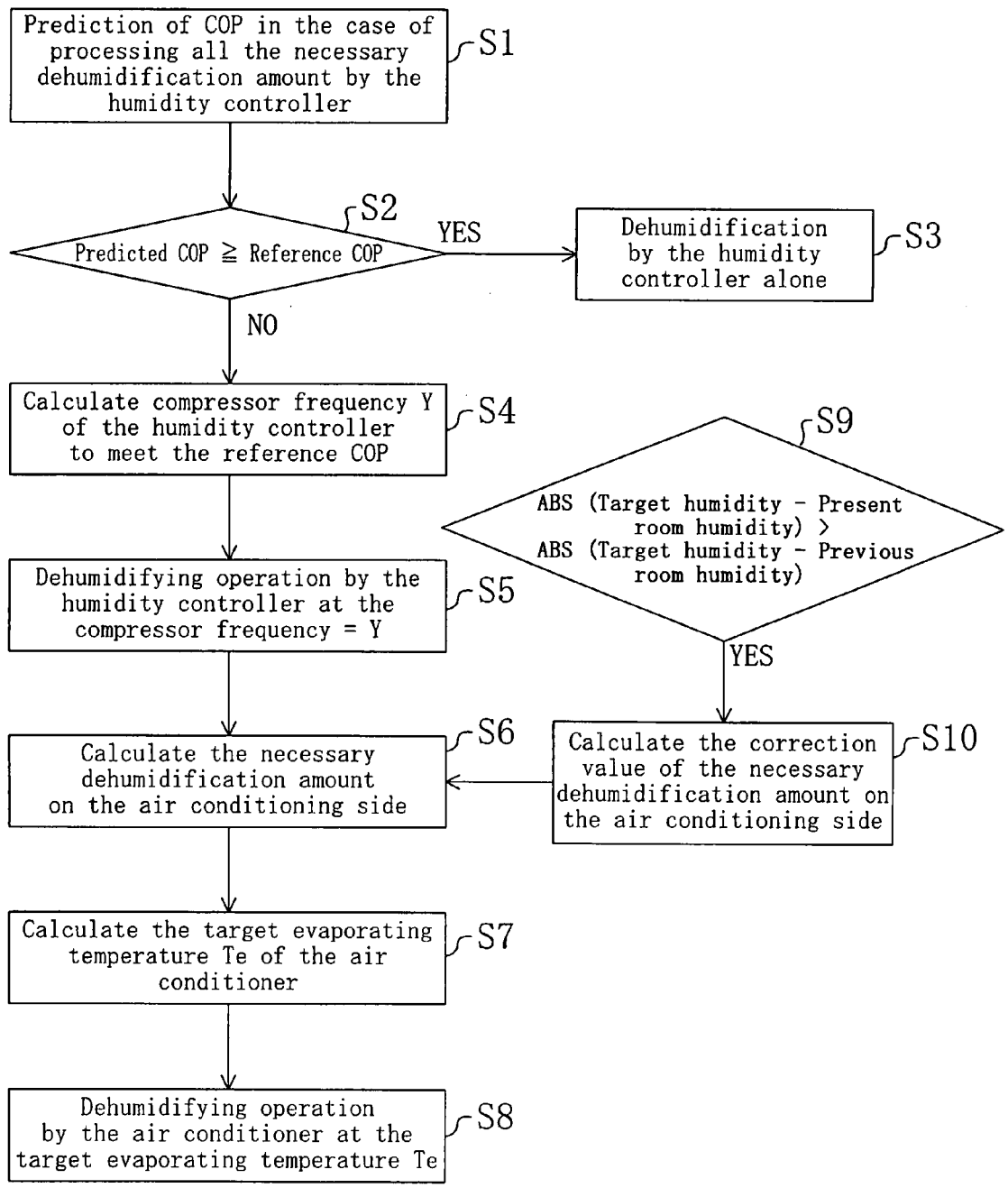
FIG. 7 is a schematic control flow chart showing control operation at the refrigerating dehumidifying operation of an air conditioning system of a modified example 2.

In the control operation of a modified example 2 shown in FIG. 7, correction for the necessary dehumidification amount on the air conditioning side is carried out in the foregoing step S6. Specifically, in the control operation of the second modified example, the room humidity is detected at pre-set intervals in step S9. At this point, if the absolute value of a humidity difference between the room target humidity and the present room humidity is larger than the absolute value of a humidity difference between the room target humidity and the room humidity of previous detection, it is determined that the room humidity has not converged to the target humidity. As a result, a shift is made to step S10, where a correction value of the necessary dehumidification amount on the air conditioning side is calculated from the previous room humidity, the present room humidity, and the target humidity. In step S6, the necessary dehumidification amount on the air conditioning side is multiplied by this correction value, thus resetting a necessary dehumidification amount on the air conditioning side that causes the room humidity to converge to the target humidity.

In the control operation of this modified example 2, correction of the dehumidifying capacity of the air conditioner (20) is carried out in the above-described manner so that the room humidity can surely converge to the target humidity. This improves the reliability of this air conditioning system (1).

Modified Example 3

Figure 8:
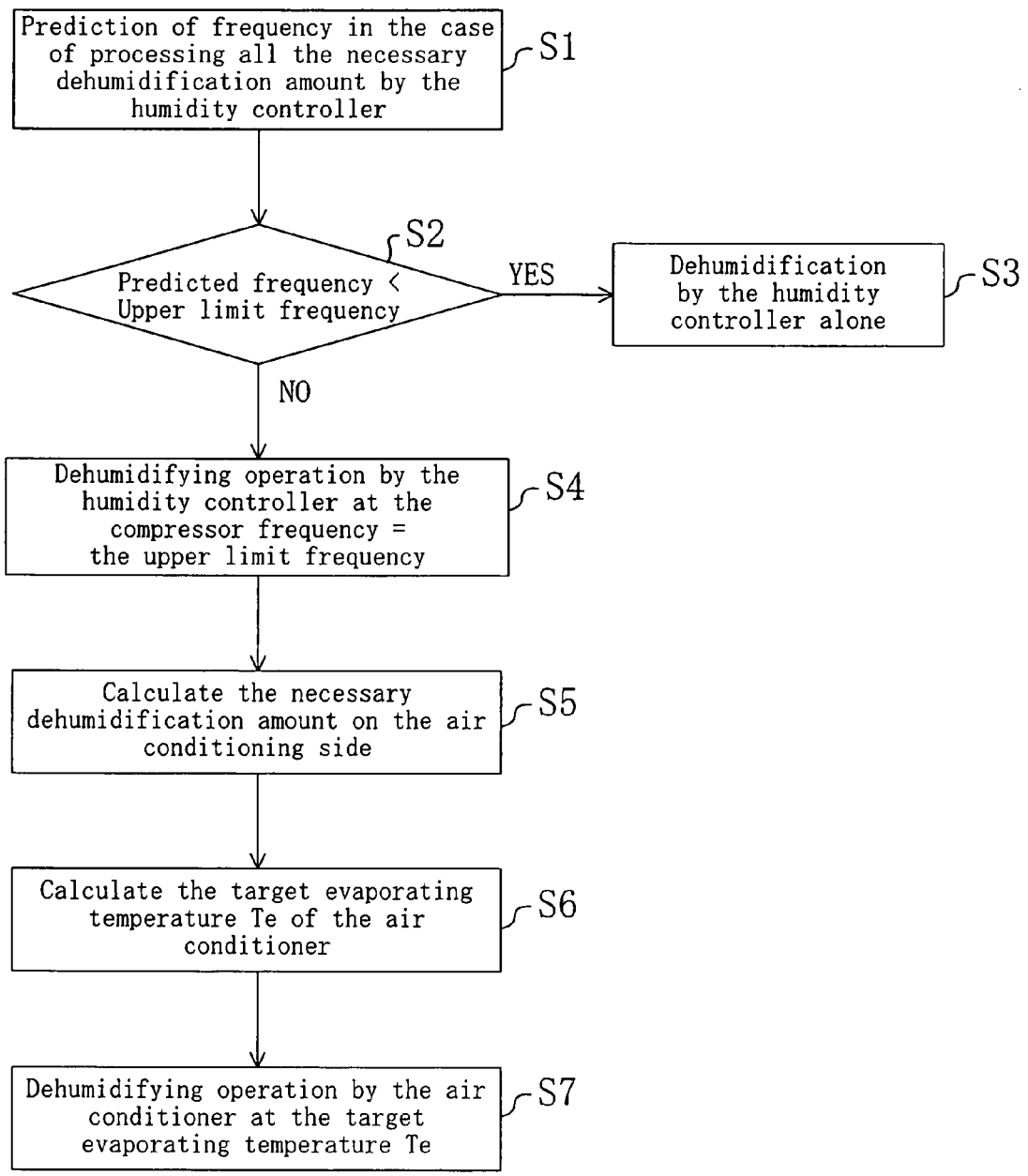
FIG. 8 is a schematic control flow chart showing control operation at the refrigerating dehumidifying operation of an air conditioning system of a modified example 3.

In the control operation of a modified example 3 shown in FIG. 8, the decision-making action for switching between the normal operation and the simultaneous dehumidifying operation is different from the above-mentioned embodiment. That is, in this modified example 3, when the necessary dehumidification amount to be processed by this air conditioning system (1) is calculated in step S1, the arithmetic section (43) calculates as an estimated frequency the operating frequency of the compressor (53) of the humidity controller (10) which is needed when processing this necessary dehumidification amount by the humidity controller (10) alone.

Next, in step S2, the humidity adjustment section (41) makes a decision on switching between the normal operation and the simultaneous dehumidifying operation. Specifically, in the humidity adjustment section (41), a comparison of magnitude is made between the estimated frequency calculated in step S1 and the pre-set upper limit frequency, and makes switching between the normal operation and the simultaneous dehumidifying operation. The above-mentioned upper limit frequency is the operating frequency of the compressor (53) which becomes the upper limit to cause the compressor (53) and the humidity controller (10) to operate efficiently.

At this point, in the case where, in step S2, the estimated frequency calculated in step S1 is less than the upper limit frequency, it is determined that even if the necessary dehumidifying amount is all processed by the humidity controller (10) alone, highly efficient dehumidification can be performed by the humidity controller (10). Consequently, in such a case, a shift is made to step S3, where the normal operation is carried out.

On the other hand, in the case where, in step S2, the estimated frequency calculated in step S1 is equal to or more than the upper limit frequency, it is determined that if the necessary dehumidifying amount is all processed by the humidity controller (10) alone, the operating efficiency of the humidity controller (10) would decrease. Hence, in such a case, a shift is made to step S4, where the simultaneous dehumidifying operation is carried out. In this step S4, the frequency of the compressor (53) is controlled so as to become the above-mentioned upper limit frequency. Thereafter, in the same way as the above-mentioned embodiment, steps S5 to S7 are implemented, where air dehumidification is carried out by both the humidity controller (10) and the air conditioner (20).

In the control operation of this modified example 3, switching between the normal operation and the simultaneous dehumidifying operation can be automatically made by comparison of magnitude between the estimated frequency of the compressor (53) and the upper limit frequency. At this point, in the simultaneous dehumidifying operation, the frequency of the compressor (53) of the humidity controller (10) is so restricted as to become the upper limit frequency. Accordingly, the humidity controller (10) is surely prevented from suffering overload operation, thus enabling this air conditioning system (1) to perform air dehumidification efficiently.

It should be noted that the switching decision making action from steps S1 to S4 in the modified example 3 may be applied to the foregoing modified example 1 and the modified example 2.

Other Embodiments

In each of the above-mentioned embodiments, the arithmetic section (43) estimates the operating efficiency of the humidity controller (10), in order to control the dehumidifying capacity so as to meet the reference operating efficiency of the humidity controller (10) in the simultaneous dehumidifying operation. However, for example, the operating efficiency (e.g., COP) of the air conditioner (20) in the simultaneous dehumidifying operation may be further calculated by the arithmetic section (43). At this point, if the COP on the air conditioning side is less than the reference COP of the humidity controller (10), correction for lowering the above-mentioned reference COP may be made in step S4 to control the compressor frequency of the humidity controller (10) in such a way as to meet the corrected reference COP. In this case, although the actual COP of the humidity controller (10) will decrease, the necessary amount of humidity adjustment on the air conditioning side can be reduced, thus improving the actual COP of the air conditioner (20).

Figure 11:
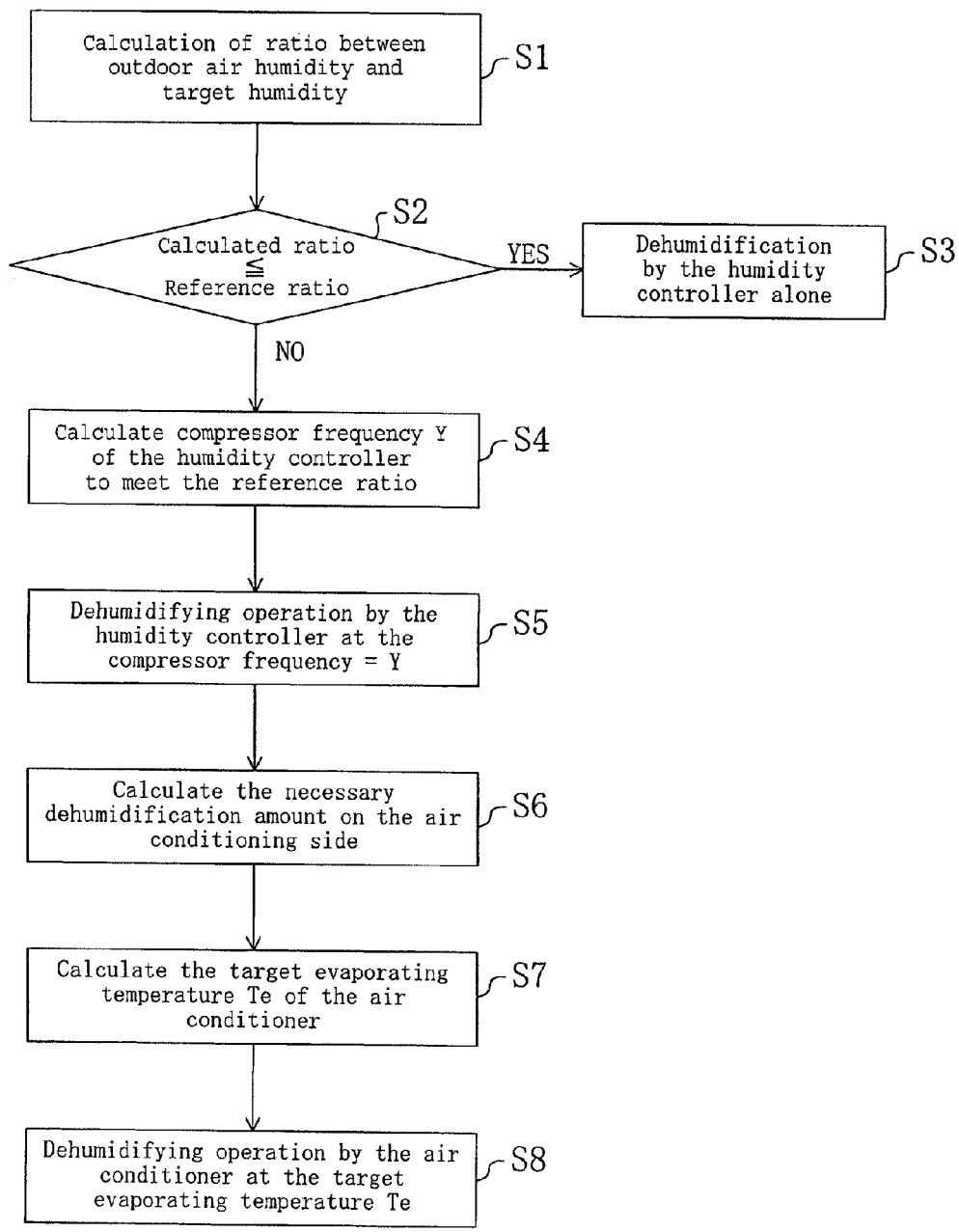
FIG. 11 is a schematic control flow chart showing control operation of the refrigerating dehumidifying operation of an air conditioning system of another embodiment.

Further, in each of the above-mentioned embodiments, the decision on switching between the normal operation and the simultaneous dehumidifying operation is made by comparison of magnitude between the operating efficiency estimated by the arithmetic section (43) and the reference operating efficiency. Alternatively, as shown in FIG. 11, the decision on switching between the normal operation and the simultaneous dehumidifying operation may be made according to the humidity of the outdoor air. Specifically, the arithmetic section (43) calculates a ratio between the outdoor air humidity and the target humidity of the air conditioning system (outdoor air humidity/target humidity) in step S1. In step S2, if this ratio is lower than the reference value, the necessary dehumidification amount to be processed by this air conditioning system (1) is considered relatively small, followed by a shift to the normal operation in step S3. On the other hand, in step S2, if this ratio is higher than the reference value, the necessary dehumidification amount to be processed by this air conditioning system (1) is considered relatively large, followed by a shift to the simultaneous dehumidifying operation in step S4. Then steps S5 to S8 are implemented in the same way as the above-mentioned embodiment shown in FIG. 5.

Further, the humidity controller (10) of each of the above-mentioned embodiments dehumidifies air by means of the adsorbing agent supported on the adsorbing heat exchangers (51 and 52). However, this humidity controller (10) may be configured as described in the following modified examples.

First Modified Example of the Humidity Controller

As shown in FIG. 9, the humidity controller (10) of the first modified example is provided with a refrigerant circuit (100) and two adsorbing elements (111 and 112). The refrigerant circuit (100) is a closed circuit in which a compressor (101), a condenser (102), an expansion valve (103), and an evaporator (104) are connected by turns. When the refrigerant circuit (100) circulates a refrigerant, a steam compression freezing cycle is performed. This refrigerant circuit (100) constitutes heat source means. A first adsorbing element (111) and a second adsorbing element (112) have adsorbing agents such as zeolite, each constituting an adsorption member. Further, each adsorbing element (111 and 112) is formed of numerous air paths, and air when passing through these paths comes in contact with the adsorbing agent.

This humidity controller (10) repeats the first operation and the second operation. As shown in FIG. 9(A), the humidity controller (10) in the first operation supplies air heated in the condenser (102) to the first adsorbing element (111) to regenerate the adsorbing agent, while refrigerating in the evaporator (104) the air which has been deprived of moisture by the second adsorbing element (112). Further, as shown in FIG. 9(B), the humidity controller (10) in the second operation supplies air heated in the condenser (102) to the second adsorbing element (112) to regenerate the adsorbing agent, while refrigerating in the evaporator (104) the air which has been deprived of moisture by the first adsorbing element (111). The humidity controller (10) performs, through switching, the dehumidifying operation of supplying to the room the air which is dehumidified while passing through the adsorbing elements (111 and 112) and the humidifying operation of supplying to the room the air which is humidified while passing through the adsorbing agents (111 and 112).

Second Modified Example of the Humidity Controller

Figure 10:
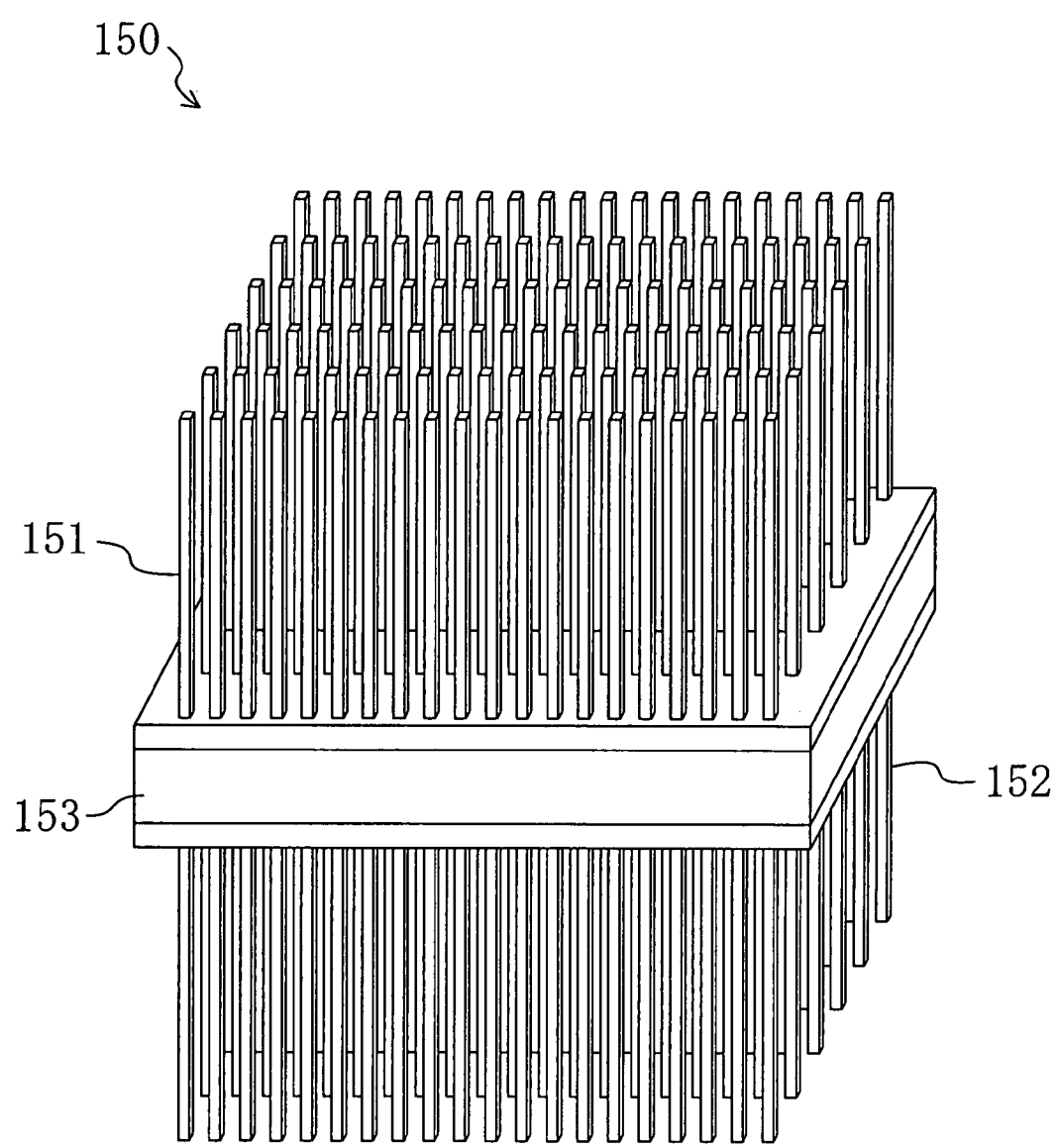
FIG. 10 is a schematic perspective view of a humidity adjustment unit in a modified example 2 of another embodiment.

As shown in FIG. 10, the humidity controller (10) of the second modified example is provided with a humidity adjustment unit (150). This humidity adjustment unit (150) is provided with a Peltier element (153) and a pair of adsorbing fins (151 and 152). The adsorbing fins (151 and 152) are each composed of a so-called heat sink whose surface supports the adsorbing agent such as zeolite. The adsorbing fins (151 and 152) constitute adsorbing members. On one surface of the Peltier element (153) is connected a first adsorbing fin (151), while on the other surface thereof is connected a second adsorbing fin (152). When a direct current is run on the Peltier element (153), one of the two adsorbing fins (151 and 152) becomes a heat adsorption side while the other becomes a heat release side. The Peltier element (153) constitutes heat source means.

The humidity controller (10) repeats the first operation and the second operation. The humidity adjustment unit (150) in the first operation regenerates the adsorbing agent of the first adsorbing fin (151), which became the heat release side, and humidifies air, while causing the adsorbing agent of the second adsorbing fin (152), which became the heat adsorption side, to adsorb moisture and dehumidify air. Further, the humidity adjustment unit (150) in the first operation regenerates the adsorbing agent of the second adsorbing fin (152), which became the heat release side, and humidifies air, while causing the adsorbing agent of the first adsorbing fin (151), which became the heat adsorption side, to adsorb moisture and dehumidify air. The humidity controller (10) performs, through switching, the dehumidifying operation of supplying to the room the air which is dehumidified while passing through the humidity adjustment unit (150) and the humidifying operation of supplying to the room the air which is humidified while passing through the humidity adjustment unit (150).

The embodiments described above represent intrinsically desirable exemplification, and is in no way intended to limit the present invention, its applications or the range of its use.

INDUSTRIAL APPLICABILITY

As described in the foregoing, the present invention is useful for air conditioning systems supplying to the same room air which is dehumidified in the humidity controller and air which is refrigerated in the air conditioner air.

The invention claimed is:

1. An air conditioning system comprising,
    a humidity controller and an air conditioner and supplying to the same room air dehumidified by the humidity controller and air refrigerated by the air conditioner; and
    an arithmetic section for calculating at least one of an estimated operating efficiency of the humidity controller, an estimated operating frequency of the humidity controller, and a ratio between a outdoor air humidity and a target humidity of the air conditioning system, wherein:
    the air conditioner is configured to be capable of operating to dehumidify air during refrigeration thereof by condensing moisture in the air; and
    a normal operation to dehumidify air by the humidity controller alone and a simultaneous dehumidifying operation to dehumidify air by the humidity controller and the air conditioner are configured to be switchable to one another based on a result of the calculation by the arithmetic section.

2. An air conditioning system according to claim 1, wherein
    the arithmetic section calculates the estimated operating efficiency of the humidity controller when air is dehumidified by the humidity controller alone, and
    the normal operation is performed when the operating efficiency of the humidity controller estimated by the arithmetic section is equal to or more than a reference operating efficiency, while the simultaneous dehumidifying operation is performed when the operating efficiency of the humidity controller estimated by the arithmetic section is less than the reference operating efficiency.

3. The air conditioning system according to claim 2, wherein during the simultaneous dehumidifying operation, a dehumidifying capacity of the humidity controller is adjusted such that the operating efficiency of the humidity controller becomes the reference operating efficiency.

4. The air conditioning system according to claim 1, wherein:
    the humidity controller is configured to dehumidify outdoor air and supply the dehumidified air to the room; and
    the normal operation and the simultaneous dehumidifying operation are switched to one another depending on the ratio between a outdoor air humidity and a target humidity of the air conditioning system.

5. The air conditioning system according to claim 1, wherein:
    the humidity controller comprises a refrigerant circuit having a compressor of variable capacity, and adsorbing members on which an adsorbing agent is supported, the humidity controller being configured to dehumidify air that comes into contact with the adsorbing agent of the adsorbing members refrigerated by the refrigerant of the refrigerant circuit;
    the arithmetic calculates the estimated operating efficiency of the humidity controller when air is dehumidified by the humidity controller alone; and
    the normal operation is performed when the operating efficiency of the humidity controller estimated by the arithmetic section is equal to or more than a reference operating efficiency, while the simultaneous dehumidifying operation is performed when the operating efficiency of the humidity controller estimated by the arithmetic section is less than the reference operating efficiency.

6. The air conditioning system according to claim 1, wherein:
the humidity controller comprises a refrigerant circuit having a compressor of variable capacity, and adsorbing members on which an adsorbing agent is supported, the humidity controller being configured to dehumidify air that comes into contact with the adsorbing agent of the adsorbing members refrigerated by the refrigerant of the refrigerant circuit;
the arithmetic calculates the estimated operating frequency of the humidity controller when air is dehumidified by the humidity controller alone; and
the normal operation is performed when the operating frequency of the humidity controller estimated by the arithmetic section is less than an upper limit frequency, while the simultaneous dehumidifying operation is performed when the operating frequency of the humidity controller estimated by the arithmetic section is equal to or more than the reference operating frequency.

7. The air conditioning system according to claim 4, wherein:
the normal operation is performed when the ratio is lower than a reference value, while the simultaneous dehumidifying operation is performed when the ratio is higher than the reference value.

* * * * *